United States Patent
Haylock et al.

(10) Patent No.: US 9,759,246 B2
(45) Date of Patent: Sep. 12, 2017

(54) TEXTURED SLEEVES FOR FASTENERS

(71) Applicant: ALCOA INC., Pittsburgh, PA (US)

(72) Inventors: Luke Haylock, Culver City, CA (US); Hasim Mulazimoglu, Buena Park, CA (US)

(73) Assignee: Arconic Inc., Pittsburgh, PA (US)

( * ) Notice: Subject to any disclaimer, the term of this patent is extended or adjusted under 35 U.S.C. 154(b) by 205 days.

(21) Appl. No.: 14/833,885

(22) Filed: Aug. 24, 2015

(65) Prior Publication Data

US 2016/0053786 A1 Feb. 25, 2016

Related U.S. Application Data

(60) Provisional application No. 62/041,416, filed on Aug. 25, 2014.

(51) Int. Cl.
| | |
|---|---|
| *F16B 5/02* | (2006.01) |
| *B64D 45/02* | (2006.01) |
| *F16B 19/00* | (2006.01) |
| *F16B 19/05* | (2006.01) |

(52) U.S. Cl.
CPC ............ *F16B 5/0258* (2013.01); *B64D 45/02* (2013.01); *F16B 19/008* (2013.01); *F16B 19/05* (2013.01)

(58) Field of Classification Search
CPC .................................................... F16B 5/0258
USPC ................................................ 411/71–74, 69
See application file for complete search history.

(56) References Cited

U.S. PATENT DOCUMENTS

| | | | |
|---|---|---|---|
| 2,120,577 | A * | 6/1938 | Schulte ............... F16B 13/0858 411/71 |
| 2,396,661 | A | 3/1946 | Keller et al. |
| 2,501,567 | A | 3/1950 | Huck |
| 2,940,767 | A | 6/1960 | Quayle |
| 3,041,912 | A | 7/1962 | Kreider et al. |

(Continued)

FOREIGN PATENT DOCUMENTS

| | | |
|---|---|---|
| DE | 202 10 801 U1 | 10/2002 |
| DE | 10 2010 009901 A1 | 9/2011 |

(Continued)

OTHER PUBLICATIONS

International Search Report and Written Opinion dated Dec. 14, 2015, issued by the European Patent Office in International (PCT) Application No. PCT/US2015/050105 (11 pages).

(Continued)

*Primary Examiner* — Flemming Saether
(74) *Attorney, Agent, or Firm* — Greenberg Traurig, LLP

(57) ABSTRACT

A fastener adapted to be installed in a hole of a composite structure includes a sleeve, a pin member, and a locking member. The sleeve has an outer surface having an outer diameter. The outer surface of the sleeve is textured. The outer diameter of the tubular portion is less than an inner diameter of the hole of the structure. The pin member has a shank portion. The sleeve is adapted to expand radially over the shank portion of the pin member to form an interference fit between the outer surface of the sleeve and the hole of the structure so as to provide an installed position of the fastener. When the fastener is in the installed position, the texture of the outer surface of the tubular portion deforms to engage with voids of the composite material present on the inner surface of the hole.

9 Claims, 6 Drawing Sheets

(56) References Cited

U.S. PATENT DOCUMENTS

| | | | |
|---|---|---|---|
| 3,215,024 A | 11/1965 | Brilmyer et al. | |
| 3,271,058 A | 9/1966 | Anderson | |
| 3,304,109 A | 2/1967 | Schuster | |
| 3,464,306 A | 9/1969 | Reynolds et al. | |
| 3,535,911 A | 10/1970 | Armstrong et al. | |
| 3,792,933 A | 2/1974 | Stencel | |
| 3,820,297 A | 6/1974 | Hurd | |
| 3,835,615 A | 9/1974 | King, Jr. | |
| 3,837,042 A * | 9/1974 | White | E05D 11/082 16/339 |
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,048,898 A | 9/1977 | Salter | |
| 4,102,030 A | 7/1978 | King, Jr. | |
| 4,164,807 A | 8/1979 | King, Jr. | |
| 4,244,661 A | 1/1981 | Dervy | |
| 4,405,256 A | 9/1983 | King, Jr. | |
| 4,472,096 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covey | |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| D372,857 S | 8/1996 | Hirai | |
| 6,149,363 A | 11/2000 | March | |
| 6,213,699 B1 | 4/2001 | Sadri et al. | |
| 6,499,926 B2 | 12/2002 | Keener | |
| 6,589,918 B2 | 7/2003 | Denpo et al. | |
| 6,659,699 B2 | 12/2003 | Stoewer et al. | |
| 6,665,922 B2 | 12/2003 | Schultz | |
| 6,746,192 B2 * | 6/2004 | Eshraghi | F16B 19/1045 411/37 |
| 7,050,286 B2 | 5/2006 | Pridham et al. | |
| 7,059,816 B2 * | 6/2006 | Toosky | B23P 9/025 411/108 |
| 7,236,343 B2 | 6/2007 | Heidlebaugh et al. | |
| 7,277,266 B1 | 10/2007 | Le et al. | |
| 7,307,825 B2 | 12/2007 | De La Fuente De Anna et al. | |
| 7,326,015 B2 | 2/2008 | Reynolds, Jr. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,755,876 B2 | 7/2010 | Morrill et al. | |
| 7,869,181 B2 | 1/2011 | Le | |
| 7,898,785 B2 | 3/2011 | Winter et al. | |
| 7,969,706 B2 | 6/2011 | Heeter et al. | |
| 8,312,606 B2 | 11/2012 | Reid et al. | |
| 8,322,958 B2 * | 12/2012 | Haylock | F16B 39/01 411/339 |
| 8,573,910 B2 | 11/2013 | March et al. | |
| 8,636,455 B2 | 1/2014 | Wehrmeister et al. | |
| 8,647,035 B2 | 2/2014 | Bakken et al. | |
| 9,123,998 B1 | 9/2015 | LoRe | |
| 9,638,236 B2 * | 5/2017 | Kamal | F16B 33/008 |
| 2002/0119028 A1 | 8/2002 | Brown et al. | |
| 2004/0091331 A1 | 5/2004 | Schultz | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2007/0258182 A1 | 11/2007 | Morrill et al. | |
| 2008/0075555 A1 | 3/2008 | March | |
| 2008/0240925 A1 | 10/2008 | Kita et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sánchez-Brunete Álvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2010/0278616 A1 | 11/2010 | March | |
| 2011/0056718 A1 | 3/2011 | Gattus et al. | |
| 2014/0056664 A1 | 2/2014 | March | |
| 2014/0230228 A1 | 8/2014 | Whitlock et al. | |

FOREIGN PATENT DOCUMENTS

| | | |
|---|---|---|
| DE | 102013000308 A1 | 7/2014 |
| EP | 0217312 A2 | 4/1987 |
| EP | 0248122 A2 | 12/1987 |
| EP | 0468563 A1 | 1/1992 |
| EP | 2 471 712 A2 | 7/2012 |
| EP | 2 615 314 A1 | 7/2013 |
| EP | 2805889 A1 | 11/2014 |
| FR | 2 165 404 A5 | 8/1973 |
| JP | 7151111 A | 12/1996 |
| WO | 8705976 A1 | 10/1987 |
| WO | 2009/063060 A1 | 5/2009 |

OTHER PUBLICATIONS

International Search Report and Written Opinion dated Dec. 17, 2015, issued by the European Patent Office in International (PCT) Application No. PCT/US2015/050091 (12 pages).

International Search Report and Written Opinion issued in International Patent Application No. PCT/US2010/053342 entitled "Enhanced Conductivity Sleeved Fastener and Method for Making Same" (11 pages).

International Search Report and Written Opinion issued in International Patent Application No. PCT/US07/78775, dated Oct. 22, 2008 (7 pages).

International Search Report and Written Opinion issued in International Patent Application No. PCT/US2010/029758, dated Sep. 7, 2010 (11 pages).

Notice of Opposition of European Patent Application No. 07116776, including English-language translation, filed Jan. 6, 2012.

ASTM International, "Standard Guide for Measuring and Reporting Friction Coefficients", Nov. 2008, pp. 1-12.

Huck International, Inc., Huck Aerospace Fasteners for Composite Structure, copyright 1992.

"Guide d'emploi des traitements de surfaces appliques aux problemes de frottement", including its English-language translation, copyright Technique and Documentation, 2000.

Huck Manufacturing Company, "Lightweight (GP) Interference Fit Fastener for Composite Materials", Apr. 1984.

Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.

Rockwell International, Space Systems Division, "Preload Measurement in Sleeve Bolts Using an Ultrasonic Technique", Feb. 1996, by Ajay Koshti.

Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.

(56) References Cited

OTHER PUBLICATIONS

Wrocklow University of Technology, Department of Mechanical Engineering, "The Statistical Correlation of the Coefficient of Friction and Wear Rate of PTFE Composites with Steel Counterface Roughness and Hardness", Wojciech Wielaba, 2002.

\* cited by examiner

TEXTURED SLEEVES FOR FASTENERS

CROSS-REFERENCE TO RELATED APPLICATION

This application is a Section 111(a) application relating to and claiming the benefit of commonly-owned, co-pending U.S. Provisional Patent Application Ser. No. 62/041,416, entitled "TEXTURED SLEEVES FOR FASTENERS," filed Aug. 25, 2014, the entirety of which is incorporated herein by reference.

FIELD OF THE INVENTION

The present invention relates to fasteners and, more particularly, to textured sleeves for fasteners.

BACKGROUND OF THE INVENTION

Continuous fiber reinforced composites are extensively used in both primary and secondary aircraft components for a variety of applications where light weight, higher strength and corrosion resistance are primary concerns. Composites are typically composed of fine carbon fibers that are oriented at certain directions and surrounded in a supportive polymer matrix. Since the plies of the composite material are arranged at a variety of angles, and depending upon the direction of major loading, the resultant structure is typically a stacked laminated structure, which is highly anisotropic and heterogeneous. A significant portion of the composite structure is fabricated as near net-shape, but is drilled in order to facilitate joining of components using mechanical fasteners. Drilling fastener holes in composite does not compare to the uniformity of aluminum or steel since individual carbon fibers fracture at irregular angles and form microscopic voids between the fastener and the hole. As the cutting tool wears down, there is an increase of surface chipping and an increase in the amount of uncut fibers or resin and delamination. The composite microstructure containing such defects is referred to as "machining-induced micro texture."

In addition to their machining challenges, composite structures in aircrafts are more susceptible to lightning damage compared to metallic structures. Metallic materials, such as aluminum, are very conductive and are able to dissipate the high currents resulting from a lightning strike. Carbon fibers are 100 times more resistive than aluminum to the flow of current. Similarly epoxy, which is often used as a matrix in conjunction with carbon fibers, is 1 million times more resistive than aluminum. The composite structural sections of an aircraft often behave like anisotropic electrical conductors. Consequently, lightning protection of a composite structure is more complex, due to the intrinsic high resistance of carbon fibers and epoxy, the multi-layer construction, and the anisotropic nature of the structure. Some estimates indicate that, on average, each commercial aircraft in service is struck by lightning at least once per year. Aircraft flying in and around thunderstorms are often subjected to direct lightning strikes as well as to nearby lightning strikes, which may produce corona and streamer formations on the aircraft. In such cases, the lightning discharge typically originates at the aircraft and extends outward from the aircraft. While the discharge is occurring, the point of attachment moves from the nose of the aircraft and into the various panels that compromise the skin of the aircraft. The discharge usually leaves the aircraft structure through the empennage.

The protection of aircraft fuel systems against fuel vapor ignition due to lightning is even more critical. Since commercial aircraft contain relatively large amounts of fuel and also include very sensitive electronic equipment, they are required to comply with a specific set of requirements related to the lightning strike protection in order to be certified for operation. It is a well-known fact that fasteners are often the primary pathways for the conduction of the lightning currents from skin of the aircraft to supporting structures such as spars or ribs, and poor electrical contact between the fastener body and the parts of the structure can lead to detrimental fastener arcing or sparking.

To avoid the potential for ignition at the fastener/composite structure interface, some aircraft use fasteners which are in intimate contact with the fastener hole. Intimate contact between bare metallic fasteners and the hole in the composite structure has been known to be the best condition for electrical current dissipation. One approach to achieve fastener-to-composite hole intimacy is to use a sleeved fastener. This approach involves first inserting a close fitting sleeve in the hole. An interference-fit pin is then pulled into the sleeve. This expands the sleeve to bring it in contact with the wall of the hole in the composite structure. Although the sleeve substantially reduces the gap between the fastener and composite structure, it cannot eliminate the small gaps created due to the presence of drilling induced texture across the composite inner-hole surface. This machining induced texture also entraps excess sealant, an insulating material, inhibiting the intimate contact between the sleeve and the hole. This situation becomes even worse as the cutting tool wears, resulting in more and larger machining induced defects.

In order to avoid this condition, the current must dissipate through the carbon fibers perpendicular to the fastener hole. If the fastener is not in intimate contact with the inside of the hole, the instantaneous heat energy ionizes the air in the gap and creates arc plasma that blows out in the form of a spark. The intrinsic high conductivity of metallic fasteners and the large number of fasteners used in aircraft construction combine to create a condition of a high probability of lightning attachment to fasteners.

SUMMARY OF THE INVENTION

In an embodiment, a fastener is adapted to be installed in a hole of a structure. In an embodiment, the structure includes a composite material. The hole has an inner surface and an inner diameter. The fastener includes a sleeve, a pin member, and a locking member. The sleeve has a tubular portion and an enlarged head at a first end of the tubular portion. The tubular portion has an inner surface having an inner diameter and an outer surface having an outer diameter. The outer diameter of the tubular portion is less than an inner diameter of the hole of the structure. The outer surface of the tubular portion is textured. The pin member has a first end, a second end opposite the first end, an enlarged pin head at the first end, a locking portion at the second end, and a shank portion between the first end and the second end. The shank portion has a diameter greater than the inner diameter of the sleeve. The locking member is adapted to fit over the locking portion of the pin member. The sleeve is adapted to expand radially over the shank portion of the pin member to form an interference fit between the outer surface of said sleeve and the hole of the structure so as to provide an installed position of the fastener. When the fastener is in the installed position, the texture of the outer surface of the tubular portion of the sleeve engages with voids present within the inner surface of the hole.

In an embodiment, the deformation of the texture of the outer surface of the tubular portion displaces sealant from the voids of the composite material. In an embodiment, the locking member is a collar. In an embodiment, the locking member includes a counterbore portion that is adapted to fit over the locking portion of the pin member and compress the sleeve around the pin member.

In an embodiment, the textured outer surface of the tubular portion of the sleeve has a surface roughness that is greater than or equal to about 1.4 micron. In an embodiment, the sleeve has a core hardness in a range from about 30 to about 35 on a Rockwell C hardness scale. In an embodiment, the sleeve has an electrical conductivity that is greater than about 20% of an International Annealed Copper Standard. In an embodiment, the sleeve has an anodic index less than about 0.65 V.

In an embodiment, the shank portion of the pin member is cylindrical. In an embodiment, the outer surface of the sleeve is textured by a process including one or more of grit blasting and chemical etching.

In an embodiment, the inner surface of the tubular portion includes a low-friction coating. When the fastener is in the installed position, a first coefficient of friction exists between the inner surface of the tubular portion of the sleeve and the shank portion of the pin member, a second coefficient of friction exists between the outer surface of the tubular portion of the sleeve and the inner surface of the hole of the structure, and the first coefficient of friction remains less than the second coefficient of friction when the shank portion of the pin member is moved within the sleeve.

In an embodiment, a method for fabricating a sleeve for a fastener includes providing a sleeve having a tubular portion and an enlarged head at a first end of said tubular portion. The tubular portion has an inner surface having an inner diameter and an outer surface having an outer diameter. The outer diameter of the tubular portion is less than an inner diameter of the hole of the structure. The method also includes texturing the outer surface of the tubular portion.

In an embodiment, the texturing step includes grit blasting. In an embodiment, the grit blasting uses fine grit glass media. In an embodiment, the fine grit glass media has a mesh in a range from about 100 to 170.

In an embodiment, the texturing step includes chemical etching. In an embodiment, the chemical etching uses hydrochloric acid. In an embodiment, the hydrochloric acid is 50/50 hydrochloric acid.

In an embodiment, the texturing step includes grit blasting and chemical etching. In an embodiment, the texturing step textures the outer surface of the tubular portion to produce a surface roughness (Sa) greater than or equal to 1.4 microns. In an embodiment, the sleeve comprises A286 stainless steel. In an embodiment, the method also includes coating the inner surface of the tubular portion with a low-friction coating.

DETAILED DESCRIPTION OF THE DRAWINGS

Figure 2:
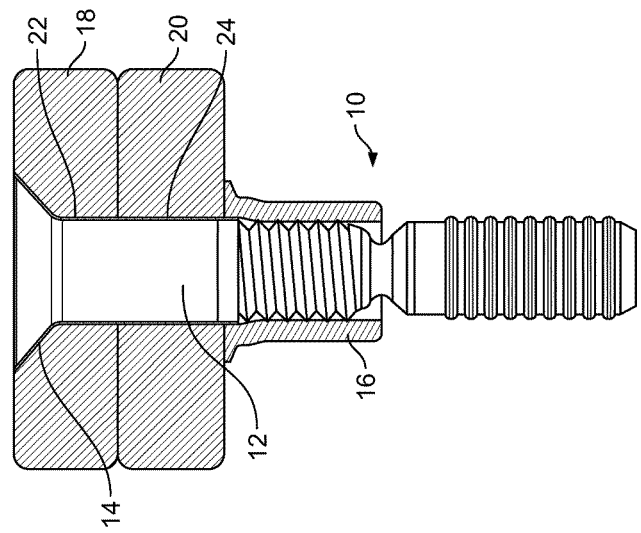
FIG. 2 illustrates the fastener shown in FIG. 1 installed within a plurality of work pieces.
Figure 1:
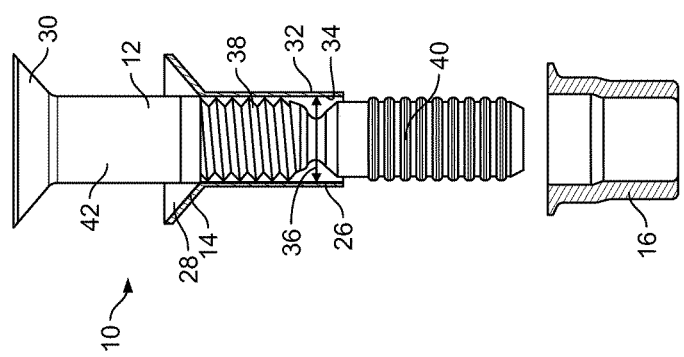
FIG. 1 is an embodiment of a fastener including a pin member, a textured sleeve, and a collar.

Referring to FIGS. 1 and 2, in an embodiment, a fastener 10 includes a pin member 12, a textured sleeve 14, and a collar 16. In other embodiments, the fastener 10 may include a nut instead of a collar 16. In an embodiment, the fastener 10 is adapted to secure a plurality of work pieces 18, 20 to one another, and is adapted to be installed within aligned holes 22, 24 in such work pieces 18, 20. In an embodiment, the work pieces 18, 20 are formed of a composite material. In an embodiment, and except as noted herein, the fastener 10 has a structure and function that are, or are similar to, the structure and function of the fasteners disclosed in U.S. Pat. No. 7,695,226 to March et al., the entirety of which is incorporated by reference herein.

In an embodiment, the textured sleeve 14 has a generally uniform tubular portion 26 that terminates in an enlarged flanged shaped head 28 to receive a head 30 of the pin member 12. In an embodiment, the sleeve 14 has an outer surface 32 and an inner surface 34. In an embodiment, the inner surface 34 has an internal diameter 36 that is greater than the outer diameters of a threaded portion 38 and a frangible portion 40 of the pin member 12, but less than the diameter of a smooth cylindrical shank portion 42 of the pin member 12. In an embodiment, the inner surface 34 of the sleeve 14 is coated with a low-friction coating. In an embodiment, the low-friction coating of the inner surface 34 provides a coefficient of friction between the inner surface 34 and the shank portion 42 of the pin member 12 that is less than a coefficient of friction between the outer surface 32 of the sleeve 14 and inner surfaces of the holes 22, 24 of the workpieces 18, 20.

Figure 3:
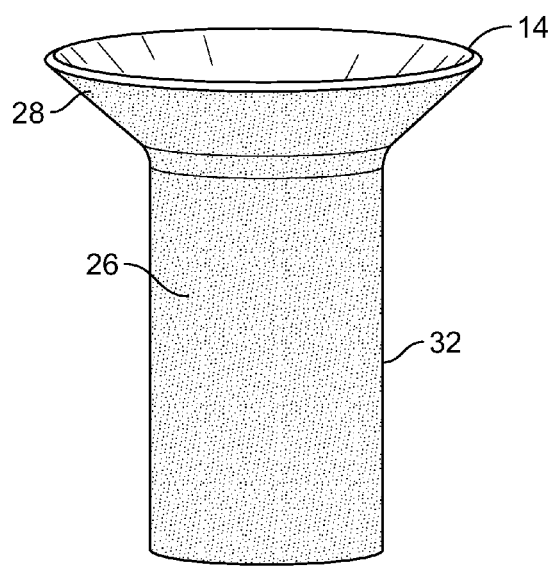
FIG. 3 is an isometric view of the exemplary textured sleeve of FIG. 1.
Figure 4:
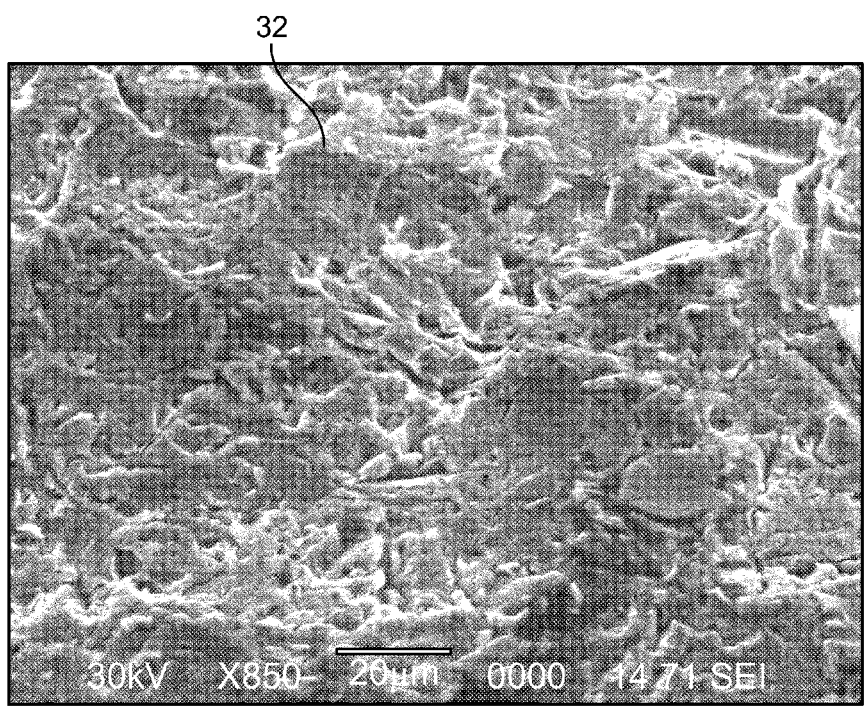
FIG. 4 is a secondary electron imaging ("SEI") photograph of an outer surface of the exemplary textured sleeve of FIG. 3.
Figure 5:
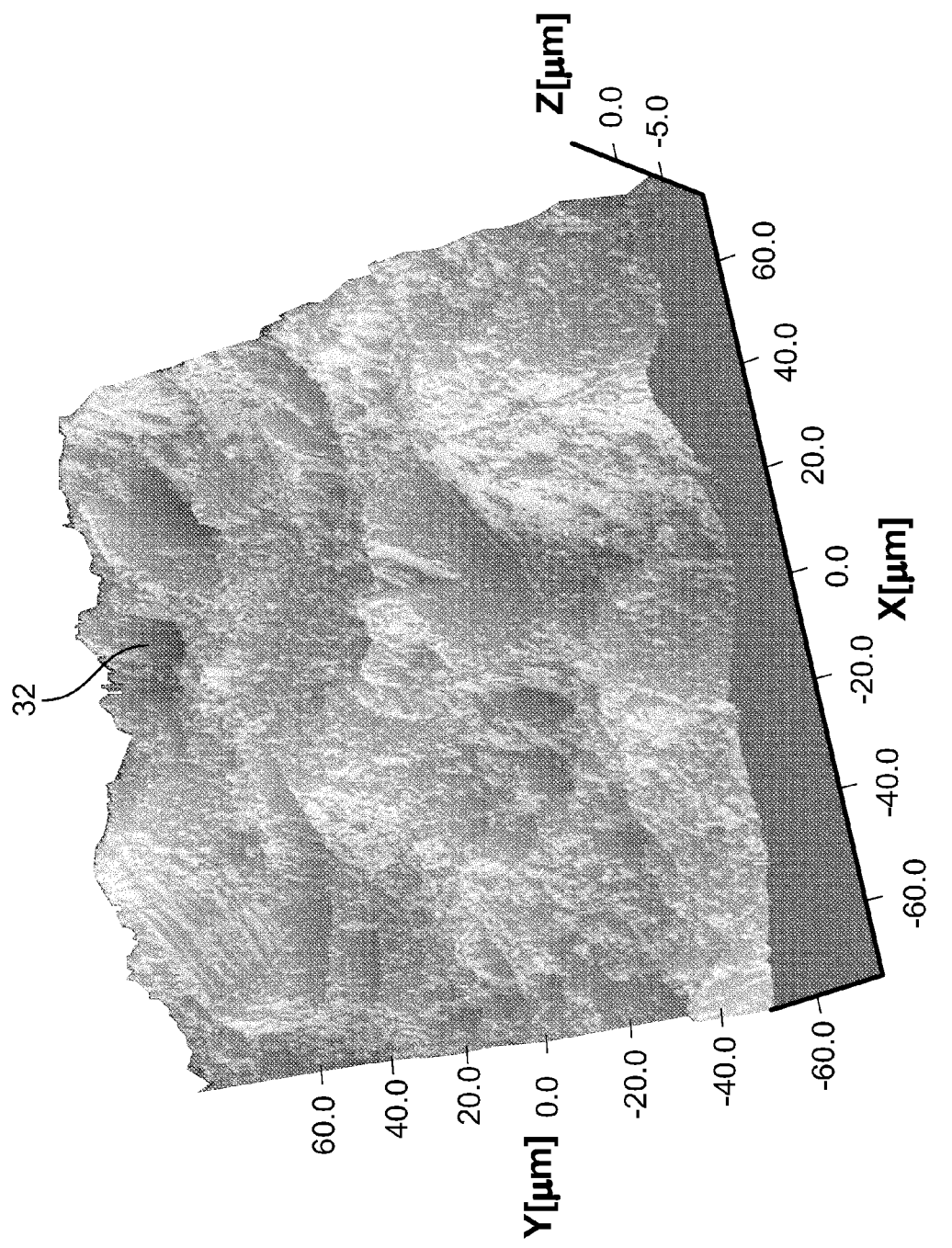
FIG. 5 is a photograph illustrating surface topography of an outer surface of the exemplary textured sleeve of FIG. 3.

Referring to FIGS. 3, 4 and 5, in an embodiment, the outer surface 32 of the textured sleeve 14 is textured. In certain embodiments, the outer surface 32 of the sleeve 14 is textured in a variety of ways, such as by mechanical grit blasting, chemical etching, or a combination of both. In an embodiment, the following process is used to obtain a desired surface texture of the outer surface 32 of the textured sleeve 14:
 (1) Start with a sleeve. In an embodiment, the initial sleeve is a cold drawn A286 sleeve.
 (2) Grit blast the outer surface 32 of the sleeve 14. In an embodiment, the grit blasting utilizes fine grit glass bead media (100-170 mesh). In an embodiment, the grit blasting is performed until there is full coverage of the outer surface 32 of the sleeve 14. In an embodiment, the grit blasting is performed for about one minute. In another embodiment, the grit blasting is performed for at least one minute. In an embodiment, the grit blasting step is performed twice.

(3) Chemical etch the sleeve 14. In an embodiment, the chemical etching utilizes 50/50 HCL. In an embodiment, the chemical etching is performed for about 30 minutes.

(4) Rinse the sleeve 14. In an embodiment, the sleeve 14 is rinsed with distilled water for about 15-20 seconds.

(5) Dry the sleeve 14. In an embodiment, the sleeve 14 is dried with forced, room-temperature air for approximately 1 to 2 minutes.

In certain embodiments, the textured sleeve 14 has the following characteristics:
 a) Surface roughness (Sa): greater than or equal to 1.4 micron. In another embodiment, the Sa is about 1.4 micron.
 b) Core hardness: in the range of 30 to 35 HRC on Rockwell C scale;
 c) Electrical conductivity: high electrical conductivity (higher than 20% of the International Annealed Copper Standard); and
 d) Corrosion resistance: galvanically compatible to composite structure (anodic index less than 0.65V).

As the textured sleeve 14 is installed in the holes 22, 24 of the work pieces 18, 20, the textured sleeve 14 deforms into any small voids that are created during drilling of the composite work pieces 18, 20. As the textured sleeve 14 deforms into the voids, it displaces the entrapped sealant during installation of the fastener 10. The insertion of the pin member 12 causes the excess sealant to be extruded outside the sleeve/composite interface. Thus, the textured sleeve 14 excavates excess entrapped sealant during installation of the fastener 10 while bringing the textured sleeve 14 in intimate contact with the work pieces 18, 20 of the composite structure. The finished texture of the outer surface 32 of the textured sleeve 14 is adjusted to provide a surface microroughness (Sa) value greater than or equal to 1.4 micron in order to increase the level of conformity and mechanical interlocking.

FIG. 3 shows an isometric view of the textured sleeve 14 including the textured outer surface 32 as described above. FIG. 4 shows a photograph of the textured outer surface 32 of the textured sleeve 14, taken using a scanning electron microscope in the secondary electron imaging ("SEI") detection mode. FIG. 5 shows the surface topography of the textured outer surface 32 of the textured sleeve 14. As can be seen, the textured outer surface 32 of the textured sleeve 14 exhibits a substantially rough finish.

Table 1 below lists the direct lightning test results obtained from the textured fasteners, which demonstrate that no evidence of arcing was detected with the textured exemplary sleeve fasteners:

TABLE 1

| Sleeve condition | Fastener #2 | Fastener #7 | Fastener #12 | Fastener #17 |
| --- | --- | --- | --- | --- |
| Textured OD surface | No spark | No spark | No spark | No spark |

Figure 6B:
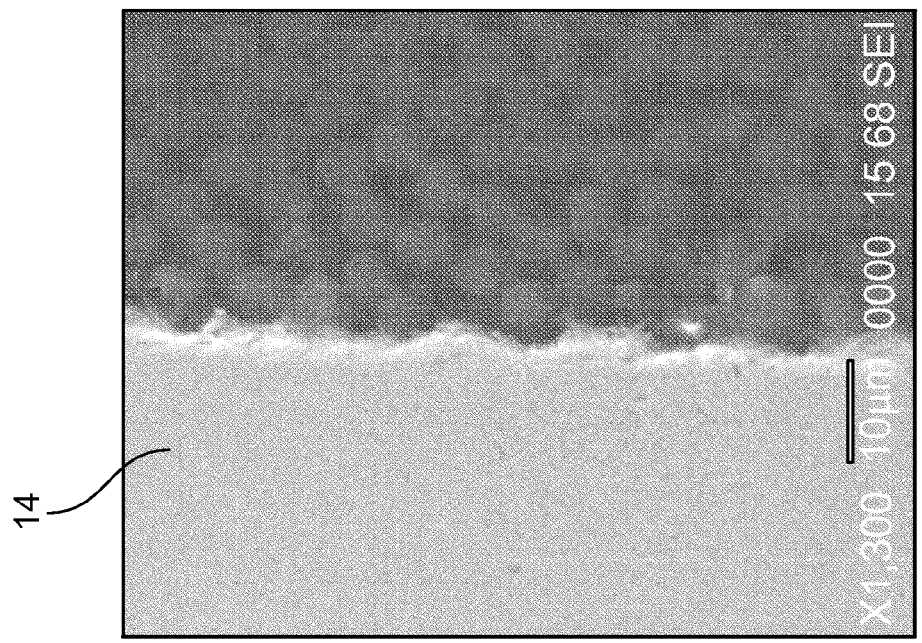
FIGS. 6A and 6B are SEI photographs illustrating intimate contact between the exemplary textured sleeve of FIG. 3 and a composite structure, while also illustrating the absence of micro-voids between the sleeve and the composite structure.
Figure 6A:
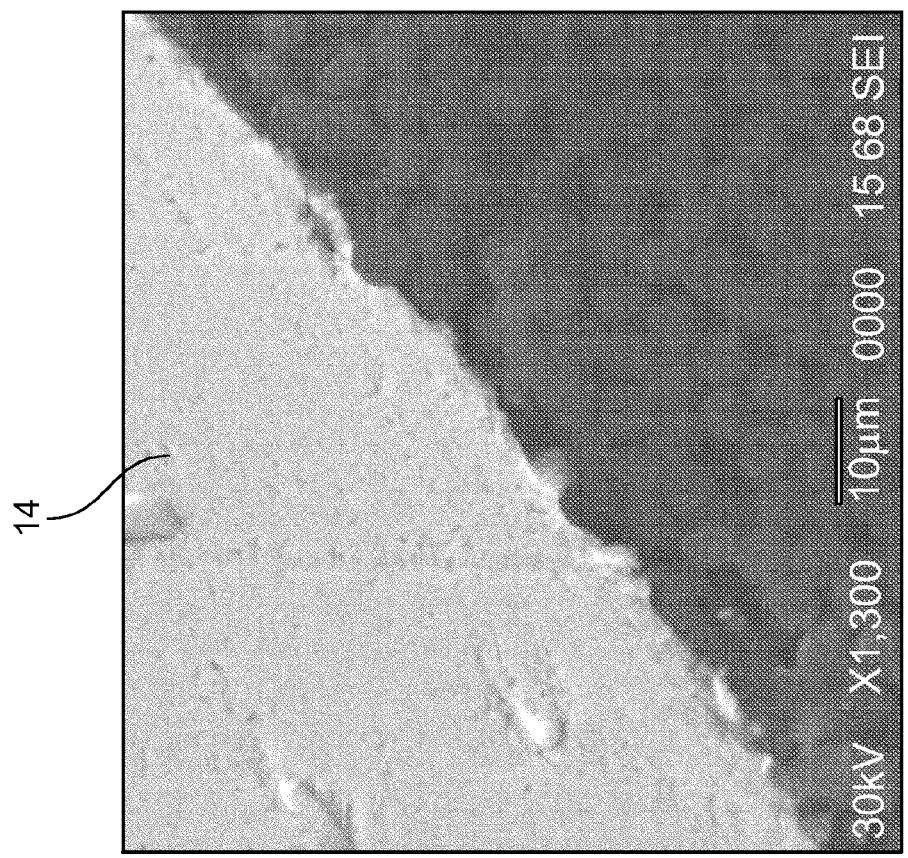
Figure 7:
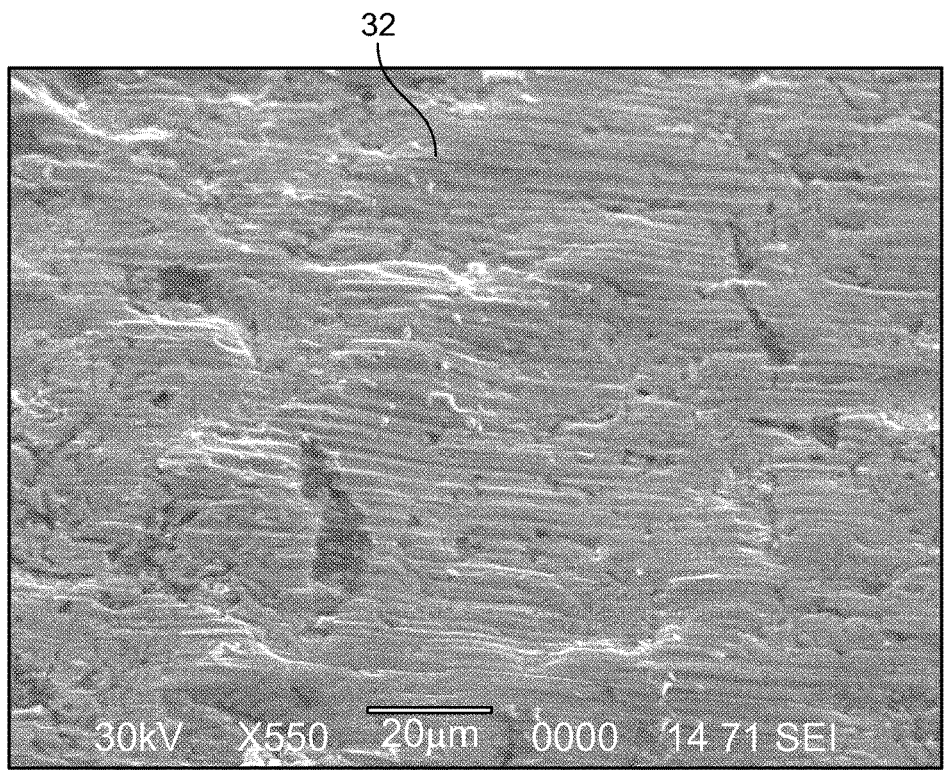
FIG. 7 is a SEI photograph showing individual carbon fiber imprints on the outer surface of the exemplary textured sleeve of FIG. 3 illustrating micro-level conformance between the textured sleeve and the composite structure as the sleeve is deformed to fill the microscopic machining induced voids.
Figure 8:
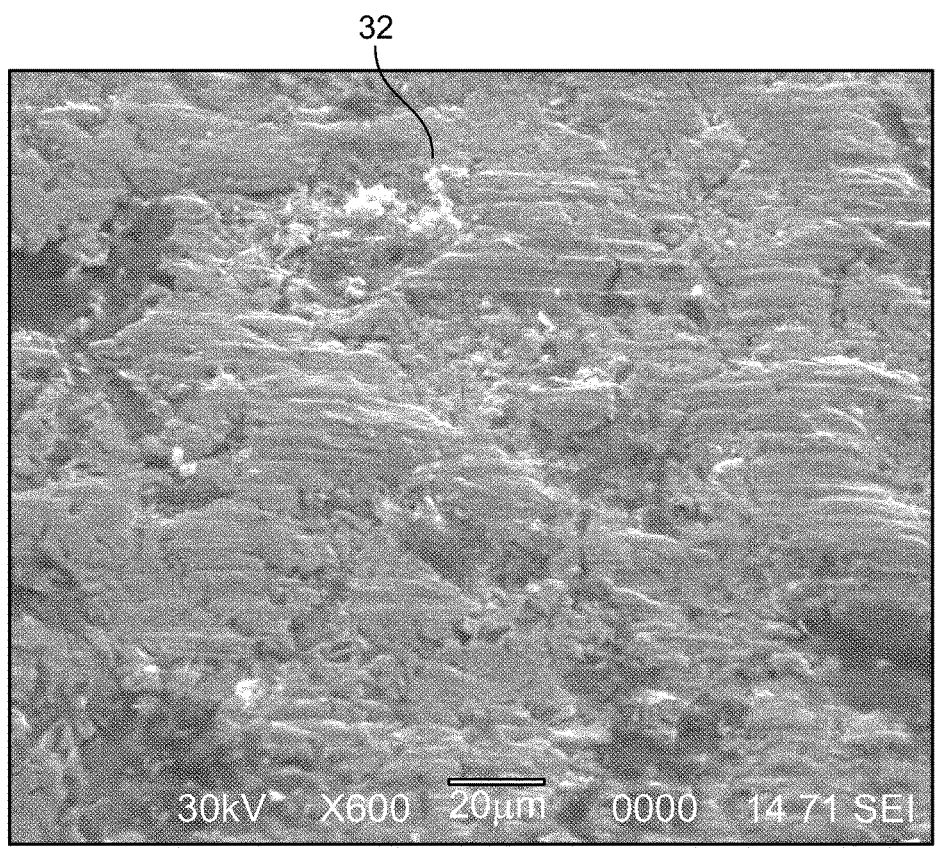
FIG. 8 is a SEI photograph of an outer surface of the exemplary textured sleeve of FIG. 3 after a lightning strike test.

FIGS. 6A and 6B are SEI photographs showing the non-existence of micro-voids between the textured sleeve 14 and the composite structure. Additionally, FIG. 7 is an SEI photograph illustrating imprints of individual carbon fibers clearly visible on the outer surface 32 of installed textured sleeves 14 indicating micro-level conformance and mechanical interlocking between the textured sleeve 14 and the panel hole as a result of micro level deformation of the textured sleeve 14. In an embodiment, the textured sleeve 14 provides intimate contact between the sleeve 14 and individual carbon fibers as it deforms to fill the microscopic machining induced voids. As the sleeve 14 deforms into the voids, it also displaces any sealant trapped inside these voids and gaps and brings the textured outer surface 32 of the textured sleeve 14 in intimate contact with the composite structure. This increased electrical contact along the textured outer surface 32 of the textured sleeve 14 decreases the current density and the voltage potential across the sleeve/composite interface by encouraging the current to be shared along the all contact surface. This allows a non-sparking current transfer from the fastener 10 to the structure and minimizes the dielectric effect caused by the sealant, thus mitigating the possibility of arcing between the textured sleeve 14 and the composite structure.

Thus, the textured sleeved 14 can:
 1—Minimize fastener arcing during lightning strikes;
 2—Provide electrical contact between carbon fibers and fastener surface;
 3—Provide gap filling and mechanical interlocking capabilities; and
 4—Improve the conforming capabilities of fastener sleeve to the hole surface.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A fastener, comprising:
 a sleeve having a tubular portion and an enlarged head at a first end of said tubular portion, said tubular portion having an inner surface having an inner diameter and an outer surface having an outer diameter, said outer diameter of said tubular portion being less than an inner diameter of a hole of a structure in which the fastener is adapted to be installed, said outer surface of said tubular portion being textured;
 a pin member having a first end, a second end opposite said first end of said pin member, an enlarged pin head at said first end of said pin member, a locking portion at said second end, and a shank portion between said first and second ends of said pin member, said shank portion having a diameter greater than said inner diameter of said sleeve; and
 a locking member adapted to fit over said locking portion of said pin member,
 wherein said sleeve is adapted to expand radially over said shank portion of said pin member to form an interference fit between said outer surface of said sleeve and the hole of the structure so as to provide an installed position of said fastener,
 wherein when said fastener is in said installed position, said texture of said outer surface of said tubular portion of said sleeve engages with voids present within the inner surface of the hole, and
 wherein said textured outer surface of said tubular portion of said sleeve has a surface roughness that is greater than or equal to about 1.4 microns.

2. The fastener of claim 1, wherein said structure comprises a composite maters, and wherein said engagement of said texture of said outer surface of said tubular portion with the voids of the composite material displaces sealant from the voids of the composite material.

3. The fastener of claim 1, wherein said textured outer surface of said tubular portion of said sleeve has a surface roughness that is about 1.4 micron.

4. The fastener of claim 1, wherein said sleeve has a core hardness in a range from about 30 to about 35 on a Rockwell C hardness scale.

5. The fastener of claim 1, wherein said sleeve has an electrical conductivity that is greater than about 20% of an International Annealed Copper Standard.

6. The fastener of claim 1, wherein said sleeve has an anodic index less than about 0.65 V.

7. The fastener of claim 1, wherein said inner surface of said tubular portion comprises a low-friction coating, and wherein, when said fastener is in said installed position, a first coefficient of friction exists between said inner surface of said tubular portion of said sleeve and said shank portion of said pin member, a second coefficient of friction exists between said outer surface of said tubular portion of said sleeve and the inner surface of the hole of the structure, and said first coefficient of friction remains less than said second coefficient of friction when said shank portion of said pin member is moved within said sleeve.

8. The fastener of claim 1, wherein said locking member is a collar.

9. The fastener of claim 8, wherein said locking member includes a counterbore portion that is adapted to fit over said locking portion of said pin member and compress said sleeve around said pin member.

\* \* \* \* \*